(12) United States Patent
Dasari et al.

(10) Patent No.: US 9,280,355 B2
(45) Date of Patent: *Mar. 8, 2016

(54) SYSTEM WITH MANUAL ACTUATOR FOR ASSERTING PHYSICAL PRESENCE ACROSS MULTIPLE COMPUTE NODES

(71) Applicant: International Business Machines Corporation, Armonk, NY (US)

(72) Inventors: Shiva R. Dasari, Austin, TX (US); Raghuswamyreddy Gundam, Austin, TX (US); Karthik Kolavasi, Austin, TX (US); Newton P. Liu, Austin, TX (US); Douglas W. Oliver, Round Rock, TX (US); Nicholas A. Ramirez, Austin, TX (US); Mehul M. Shah, Austin, TX (US); Wingcheung Tam, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 245 days.

This patent is subject to a terminal disclaimer.

(21) Appl. No.: 14/013,848

(22) Filed: Aug. 29, 2013

(65) Prior Publication Data

US 2015/0067308 A1 Mar. 5, 2015

(51) Int. Cl.
| | |
|---|---|
| *G06F 9/00* | (2006.01) |
| *G06F 9/24* | (2006.01) |
| *G06F 15/177* | (2006.01) |
| *G06F 9/44* | (2006.01) |
| *G06F 9/445* | (2006.01) |
| *G06F 21/57* | (2013.01) |

(52) U.S. Cl.
CPC .............. *G06F 9/4401* (2013.01); *G06F 9/445* (2013.01); *G06F 21/57* (2013.01)

(58) Field of Classification Search
CPC ................................... G06F 9/44; G06F 21/57
USPC ............................................................. 713/1
See application file for complete search history.

(56) References Cited

U.S. PATENT DOCUMENTS

| | | | |
|---|---|---|---|
| 7,907,051 B2 | 3/2011 | Pall et al. | |
| 8,028,165 B2 | 9/2011 | Ali et al. | |
| 8,490,179 B2 * | 7/2013 | Proudler | 726/21 |

(Continued)

OTHER PUBLICATIONS

Sun Oracale "Oracle® Integrated Lights Out Manager (ILOM) 3.0 Supplement for the Sun Blade X6275 M2 Server Module", Part No: 821-1081, Jan. 2011, Rev A, 80 pages.

(Continued)

*Primary Examiner* — Mohammed Rehman
(74) *Attorney, Agent, or Firm* — Jeffrey L. Streets

(57) ABSTRACT

A system includes a multi-node chassis including a chassis management module, a plurality of compute nodes, and a physical presence manual actuator for transmitting a physical presence signal to each compute node in response to manual actuation. Each server has a firmware interface, a trusted platform module, and an AND gate. The firmware interface has a general purpose input output pin for providing an enabling signal in response to a user instruction to a firmware interface setup program that communicates with the firmware interface. The AND gate has a first input receiving the enabling signal, a second input receiving the physical presence signal, and an output coupled to the trusted platform module, wherein the AND gate for a selected compute node asserts physical presence to the trusted platform module of the selected compute node in response to receiving both the enabling signal and the physical presence signal.

8 Claims, 3 Drawing Sheets

(56) References Cited

U.S. PATENT DOCUMENTS

| | | |
|---|---|---|
| 2004/0193883 A1 | 9/2004 | Alperin et al. |
| 2004/0205070 A1* | 10/2004 | Catherman et al. ........... 707/100 |
| 2004/0205353 A1* | 10/2004 | Catherman et al. ........... 713/200 |
| 2004/0205362 A1 | 10/2004 | Catherman et al. |
| 2006/0031448 A1 | 2/2006 | Chu et al. |
| 2009/0172806 A1 | 7/2009 | Natu et al. |
| 2012/0102254 A1* | 4/2012 | Huang .................. G06F 13/385 710/313 |
| 2013/0318607 A1* | 11/2013 | Reed .................. G06F 11/3062 726/23 |
| 2014/0259125 A1* | 9/2014 | Smith ..................... G06F 21/32 726/5 |

OTHER PUBLICATIONS

Paliwal, Yougesh, "U.S. Appl. No. 14/016,382 Office Action" Mail date: Oct. 21, 2014, 10 pages.

Paliwal, Yogesh, "U.S. Appl. No. 14/016,382 Notice of Allowance" Mail date: Jan. 20, 2015, 7 pages.

* cited by examiner

SYSTEM WITH MANUAL ACTUATOR FOR ASSERTING PHYSICAL PRESENCE ACROSS MULTIPLE COMPUTE NODES

BACKGROUND

1. Field of the Invention

The present invention relates to systems having a trusted platform module, and methods of asserting physical presence to a trusted platform module.

2. Background of the Related Art

A Trusted Platform Module (TPM) is a microcontroller that stores keys, passwords and digital certificates. A TPM is typically installed on the motherboard of a computer or any computing device that requires these functions. The nature of this microcontroller ensures that the information stored on the computer is made more secure from external software attack and physical theft. Security processes, such as digital signature and key exchange, are protected through by the TPM. For example, the TPM may deny access to data and secrets in a platform if the boot sequence is not as expected. Critical applications and capabilities such as secure email, secure web access and local protection of data are thereby made much more secure.

BRIEF SUMMARY

Another embodiment of the present invention provides a system comprising a multi-node chassis including a chassis management module, a plurality of compute nodes, and a physical presence manual actuator for transmitting a physical presence signal to each of the plurality of compute nodes within the multi-node chassis in response to manual actuation. Each server has a firmware interface, a trusted platform module, and an AND gate. The firmware interface has a general purpose input output pin for providing an enabling signal in response to a user instruction to a firmware interface setup program that communicates with the firmware interface. The AND gate has a first input receiving the enabling signal from the firmware interface, a second input receiving the physical presence signal from the physical presence manual actuator, and an output coupled to the trusted platform module, wherein the AND gate for a selected one of the plurality of compute nodes asserts physical presence to the trusted platform module of the selected compute node in response to receiving both the enabling signal and the physical presence signal.

DETAILED DESCRIPTION

Figure 1:
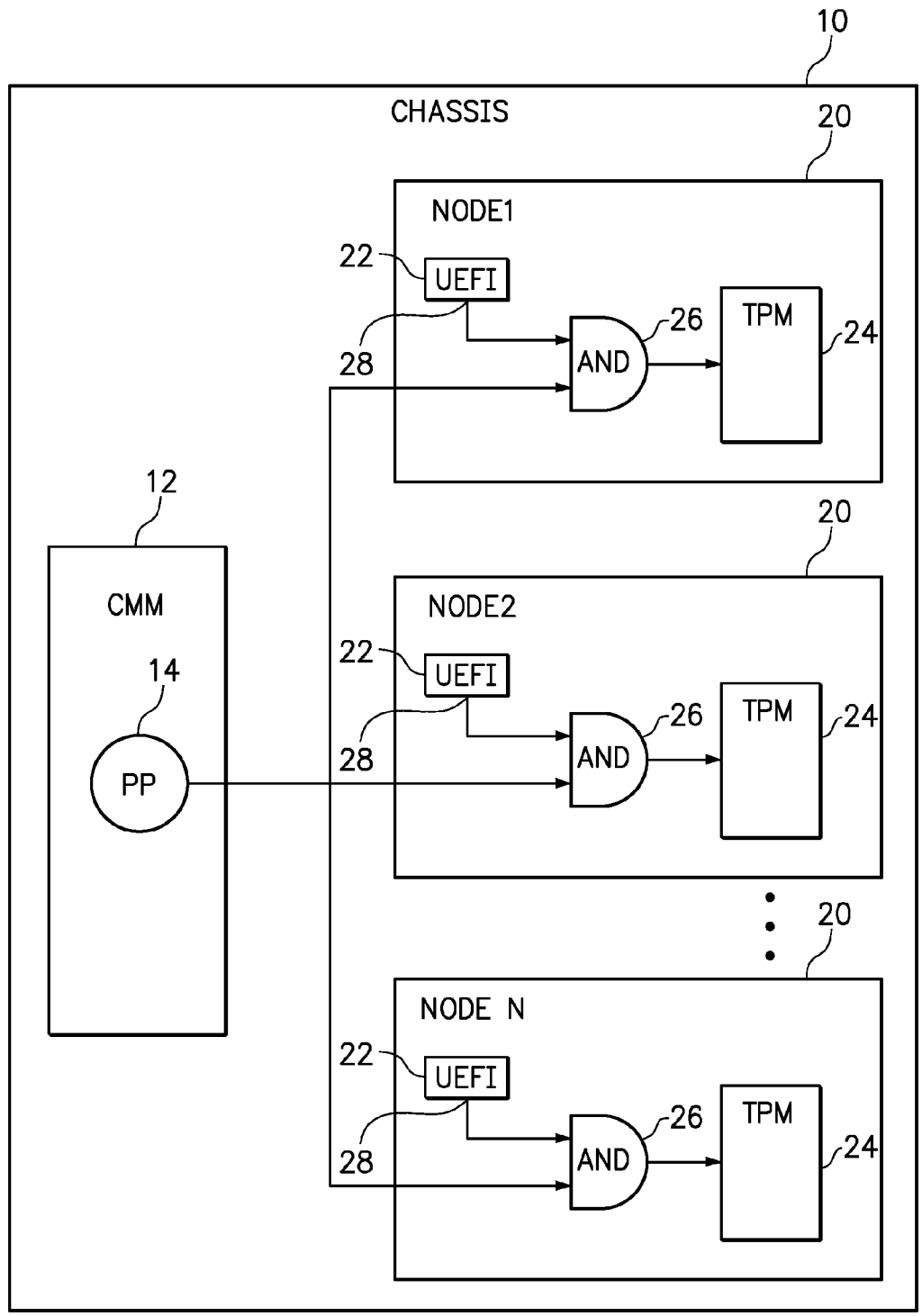
FIG. 1 is a diagram of multi-node chassis including a plurality of compute nodes within the chassis in accordance with one embodiment of the present invention.

One embodiment of the present invention provides a method comprising using a firmware interface setup program for a selected compute node to cause a firmware interface on the selected compute node to enable a trusted platform module on the selected compute node to be able to receive a physical presence signal. The selected compute node is selected from a plurality of compute nodes within a multi-node chassis, wherein each of the plurality of compute nodes includes a firmware interface and a trusted platform module. The method further comprises manually actuating a device within the multi-node chassis to transmit a physical presence signal to each of the plurality of compute nodes within the multi-node chassis, such that each of the plurality of compute nodes within the multi-node chassis receives the physical presence signal. The physical presence signal is asserted to the trusted platform module of the selected compute node in response to both enabling the trusted platform module of the selected compute node to be able to receive the physical presence signal and receiving the physical presence signal. Still further, the method comprises allowing modification of one or more security setting of the selected compute node in response to the trusted platform module of the selected compute node receiving the physical presence signal.

The multi-node chassis may, for example, be a multi-server chassis, such as a multi-blade chassis. A multi-node chassis will typically provide various services to each compute node within the multi-node chassis, such as a power source, network communications, and forced air circulation. It is also common for a multi-node chassis to include a chassis management module that manages various aspects of the operation of the services and individual compute nodes. Optionally, a physical presence actuator or device may be secured to the chassis management module within the multi-server chassis. Non-limiting examples of physical presence actuator or device includes a button or switch.

The firmware interface may, for example, be a basic input output system (BIOS) or a unified extensible firmware interface (UEFI). Accordingly, the firmware interface setup program is a setup program for the BIOS or UEFI on a particular compute node. Each compute node may have its own instance of a firmware interface setup program. An authorized user can access the firmware interface setup program for a selected compute node and instruct the firmware interface to enable the trusted platform module on the selected compute node to be able to receive a physical presence signal by generating an enabling signal. For example, the firmware interface may provide the enabling signal on a general purpose input output (GPIO) pin of the firmware interface that is installed on the selected compute node. Most preferably, the compute node will have a motherboard that includes the firmware interface and the trusted platform module.

Another embodiment of the method uses an AND gate, or equivalent logic circuit, to control assertion of the physical presence signal to the trusted platform module of the selected compute node. In a specific implementation, a first input of an AND gate receives an enabling signal from the firmware interface for enabling the trusted platform module of the selected compute node to be able to receive a physical presence signal, and a second input of the AND gate receives the physical presence signal from the physical presence actuator or device. An output of the AND gate will assert the physical presence signal to the trusted platform module of the selected compute node in response to both the first input receiving the enabling signal and the second input receiving the physical presence signal. It should be understood that actuating the physical presence actuator or device will send a physical presence signal to each compute node, but only the selected compute node that receives an enabling signal will assert physical presence to the trusted platform module of the selected compute node.

In one option, the enabling signal may be provided for a predetermined period following the user providing an instruction to the firmware interface setup program. This gives the user time to manually actuate the physical presence actuator or device, such that both inputs to the AND gate will be positive at the same time. In another option, the physical presence signal to each of the plurality of compute nodes is provided for a predetermined period after manually actuating the device. This gives the user time to access the firmware interface setup program and provide an instruction causing the firmware interface to generate the enabling signal.

In a further embodiment, the firmware interface may enable the trusted platform module of the selected compute node to be able to receive a physical presence signal no more than once per boot of the selected compute node. Optional embodiments may be implemented so that the enabling of the trusted platform module does not persist across reboots of the selected compute node.

Another embodiment of the present invention provides a system comprising a multi-node chassis including a chassis management module, a plurality of compute nodes, and a physical presence manual actuator for transmitting a physical presence signal to each of the plurality of compute nodes within the multi-node chassis in response to manual actuation. Each server has a firmware interface, a trusted platform module, and an AND gate. The firmware interface has a general purpose input output pin for providing an enabling signal in response to a user instruction to a firmware interface setup program that communicates with the firmware interface. The AND gate has a first input receiving the enabling signal from the firmware interface, a second input receiving the physical presence signal from the physical presence manual actuator, and an output coupled to the trusted platform module, wherein the AND gate for a selected one of the plurality of compute nodes asserts physical presence to the trusted platform module of the selected compute node in response to receiving both the enabling signal and the physical presence signal.

The firmware interface of each compute node may, for example, be selected from a basic input output system (BIOS) and a unified extensible firmware interface (UEFI). Optionally, the firmware interface may provide the enabling signal for a predetermined period following the user instruction to the firmware interface setup program.

In yet another embodiment, the firmware interface may provide the enabling signal to the trusted platform module of the selected compute node no more than once per boot of the selected compute node, and the enabling signal does not persist across reboots of the selected compute node (i.e., the enabling signal reverts to being disabled).

Most preferably, the trusted platform module of the selected compute node may allow modification of one or more security setting of the selected compute node in response to receiving the physical presence signal.

Non-limiting examples of the physical presence manual actuator includes a button and a switch. Optionally, the physical presence manual actuator is secured to the chassis management module. In a further option, the physical presence signal from the physical presence manual actuator to each of the plurality of compute nodes may be provided for a predetermined period after manually actuating the physical presence manual actuator.

FIG. 1 is a diagram of multi-node chassis 10 including a chassis management module 12, a plurality of compute nodes 20 (NODE 1, NODE 2 through NODE N), and a physical presence ("PP") manual actuator 14 for transmitting a physical presence signal to each of the plurality of compute nodes within the multi-node chassis in response to manual actuation. Each server 20 has a firmware interface 22, a trusted platform module 24, and an AND gate 26 or equivalent logic circuit. The firmware interface 22 has a general purpose input output pin 28 for providing an enabling signal in response to a user instruction to a firmware interface setup program (not shown; see FIG. 2) that communicates with the firmware interface. The AND gate 26 has a first input receiving the enabling signal from the firmware interface 22, a second input receiving the physical presence signal from the physical presence manual actuator 14, and an output coupled to the trusted platform module 24, wherein the AND gate for a selected one of the plurality of compute nodes asserts physical presence to the trusted platform module of the selected compute node in response to receiving both the enabling signal and the physical presence signal.

Figure 2:
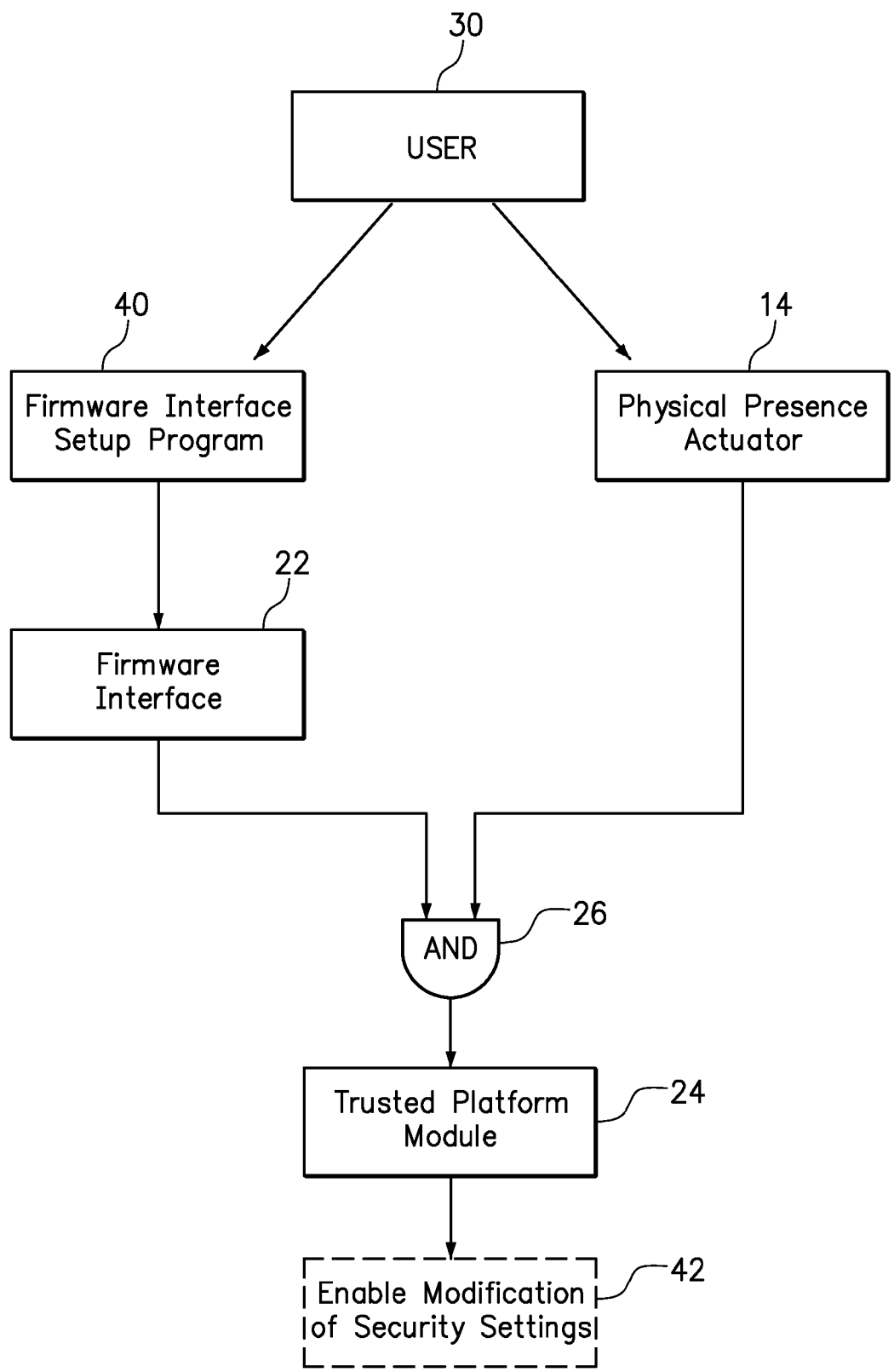
FIG. 2 is a conceptual diagram of one embodiment of the present invention.

FIG. 2 is a conceptual diagram of one embodiment of the present invention. In the diagram, a user 30 interacts with a firmware interface setup program 40, perhaps using a keyboard, mouse or other input output device, to provide an instruction that indicates the user wants to modify a security setting for a selected compute node. In response, the firmware interface setup program 40 may cause the firmware interface 22 of the selected compute node to generate an enabling signal to a first input of the AND gate 26. Preferably, the enabling signal will be active or positive during a predetermined time out period. The firmware interface setup program 40 may also provide a message to the user 30, perhaps as text on a video monitor or audio through a speaker, prompting the user to assert physical presence before the expiration of the time out period. Accordingly, the user 30 must manually actuate the physical presence actuator 14, which may be a button or switch located on a chassis management module within the same multi-node chassis as the plurality of compute nodes. Manually actuating the physical presence actuator 14 cause a physical presence signal to be sent to each of the plurality of compute nodes, although only the compute node with a firmware interface generating an enabling signal will be able to use the physical presence signal. Accordingly, the output of the AND gate 26 is provided to the trusted platform module (TPM) 24 as an assertion of physical presence. As a result, the trusted platform module 24 will enable modification of the security setting that the user previously requested of the firmware interface setup program 40.

Figure 3:
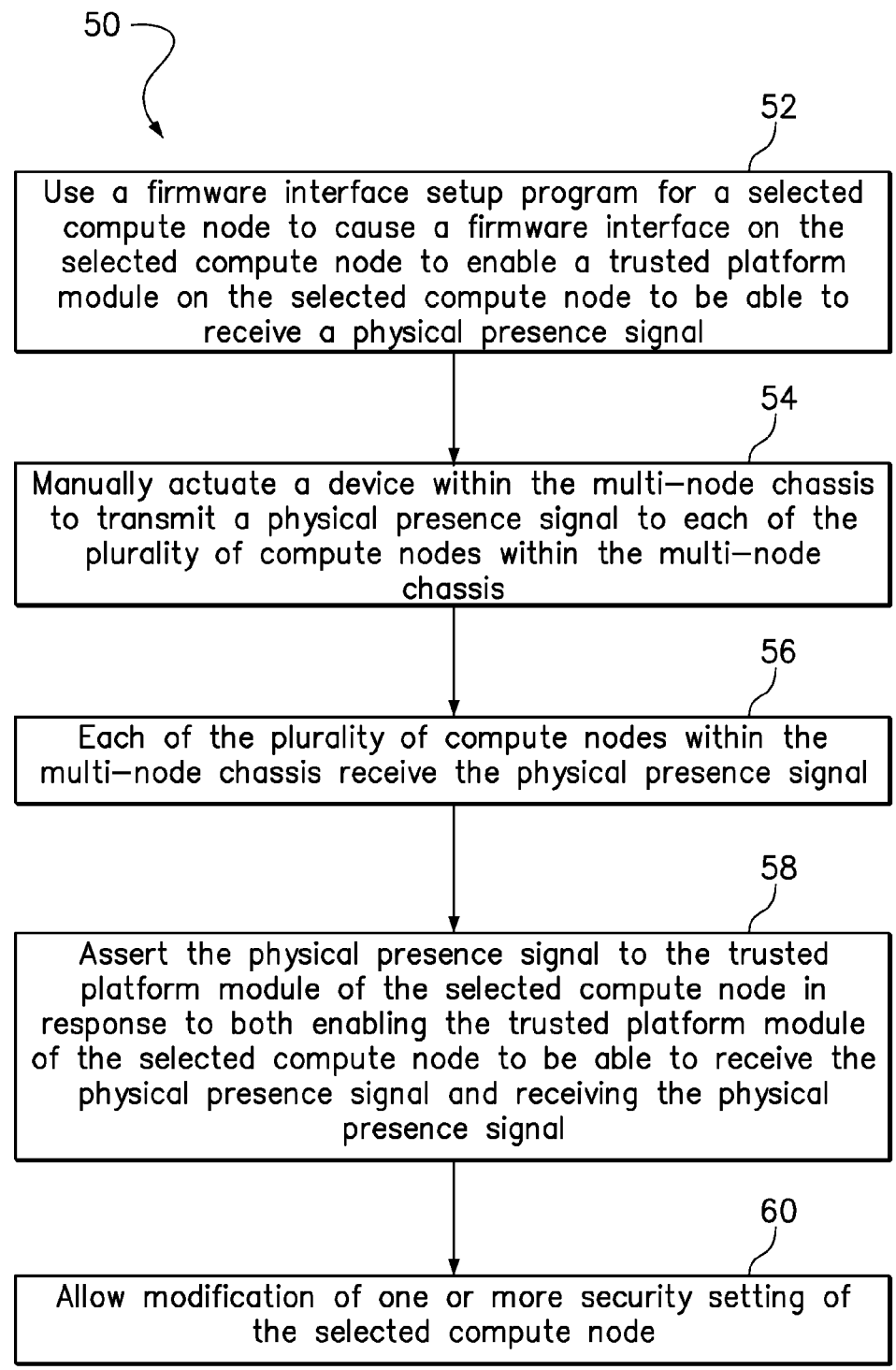
FIG. 3 is a flowchart of a method according to one embodiment of the present invention.

FIG. 3 is a flowchart of a method 50 according to one embodiment of the present invention. In step 52, a firmware interface setup program for a selected compute node is used to cause a firmware interface on the selected compute node to enable a trusted platform module on the selected compute node to be able to receive a physical presence signal. The selected compute node is selected from a plurality of compute nodes within a multi-node chassis, wherein each of the plurality of compute nodes includes a firmware interface and a trusted platform module. Step 54 includes manually actuating a device within the multi-node chassis to transmit a physical presence signal to each of the plurality of compute nodes within the multi-node chassis and, in step 56, each of the plurality of compute nodes within the multi-node chassis receive the physical presence signal. In step 58, the physical presence signal is asserted to the trusted platform module of the selected compute node in response to both enabling the trusted platform module of the selected compute node to be able to receive the physical presence signal and receiving the physical presence signal. Then, in step 60, the method allows modification of one or more security setting of the selected compute node in response to the trusted platform module of the selected compute node receiving the physical presence signal.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
a multi-node chassis including a chassis management module, a plurality of compute nodes, and a physical presence manual actuator for transmitting a physical presence signal to each of the plurality of compute nodes within the multi-node chassis in response to manual actuation;
each compute node having a firmware interface, a trusted platform module, and an AND gate, wherein the firmware interface has a general purpose input output pin for providing an enabling signal in response to a user instruction to a firmware interface setup program that communicates with the firmware interface, and wherein the AND gate has a first input receiving the enabling signal from the firmware interface, a second input receiving the physical presence signal from the physical presence manual actuator, and an output coupled to the trusted platform module, and wherein the AND gate for a selected one of the plurality of compute nodes asserts physical presence to the trusted platform module of the selected compute node in response to receiving both the enabling signal and the physical presence signal.

2. The system of claim 1, wherein the trusted platform module of the selected compute node allows modification of one or more security setting of the selected compute node in response to receiving the physical presence signal.

3. The system of claim 1, wherein the physical presence manual actuator is selected from a button and a switch.

4. The system of claim 3, wherein the physical presence manual actuator is secured to the chassis management module.

5. The system of claim 1, wherein the firmware interface of each compute node is selected from a basic input output system (BIOS) and a unified extensible firmware interface (UEFI).

6. The system of claim 1, wherein firmware interface provides the enabling signal for a predetermined period following the user instruction to the firmware interface setup program.

7. The system of claim 1, wherein the physical presence signal from the physical presence manual actuator to each of the plurality of compute nodes is provided for a predetermined period after manually actuating the physical presence manual actuator.

8. The system of claim 1, wherein the firmware interface provides the enabling signal to the trusted platform module of the selected compute node no more than once per boot of the selected compute node, and the enabling signal does not persist across reboots of the selected compute node.

* * * * *